United States Patent
Brant et al.

(10) Patent No.: US 9,569,202 B2
(45) Date of Patent: Feb. 14, 2017

(54) TRANSPARENT TYPE-BASED OBJECT AUGMENTATION BY ORTHOGONAL FUNCTIONALITY

(71) Applicant: Microsoft Corporation, Redmond, WA (US)

(72) Inventors: Thomas M. Brant, San Jose, CA (US); Eric Desfosses, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 14/319,470

(22) Filed: Jun. 30, 2014

(65) Prior Publication Data

US 2015/0355902 A1    Dec. 10, 2015

Related U.S. Application Data

(60) Provisional application No. 62/009,096, filed on Jun. 6, 2014.

(51) Int. Cl.
*G06F 9/44* (2006.01)

(52) U.S. Cl.
CPC ............... *G06F 8/70* (2013.01); *G06F 8/315* (2013.01)

(58) Field of Classification Search
CPC ........................................................ G06F 8/70
USPC ........................................................... 717/120
See application file for complete search history.

(56) References Cited

U.S. PATENT DOCUMENTS

| | | |
|---|---|---|
| 5,732,270 A | 3/1998 | Foody et al. |
| 5,920,725 A | 7/1999 | Ma et al. |
| 6,182,277 B1 | 1/2001 | DeGroot et al. |
| 6,349,343 B1 | 2/2002 | Foody et al. |
| 6,769,032 B1 | 7/2004 | Katiyar et al. |

(Continued)

OTHER PUBLICATIONS

Cicirelli, et al., "A General Brokering Architecture Layer and its Application to Video on-Demand over the Internet", In Proceedings of Informatica, vol. 31, No. 1, Oct. 14, 2009, 12 pages.

(Continued)

*Primary Examiner* — Li B Zhen
*Assistant Examiner* — Sen Chen
(74) *Attorney, Agent, or Firm* — Steven Spellman; Tom Wong; Micky Minhas

(57) ABSTRACT

Tools and techniques are described for transparently and safely augmenting the functionality of objects in an existing collection of objects. One approach automatically creates a dynamic interface for a known object type T, having the same type signature as T. Augmentations which implement the interface are then recognized, and an interpreted or compiled code environment is adjusted to invoke their functionality, which is orthogonal to the indicated functionality of type T. An application program executing in the adjusted environment automatically and transparently generates an instance of each augmentation, and the augmentations are composed to run when the original object of type T is accessed. Some suitable orthogonal functionalities include: data logging, event logging, data validation, event validation, localization of strings, localization of a display format, administrator alerts, inspection of data without alteration of the data, malware scanning, scanning for a code security vulnerability, or reporting on one of the foregoing.

20 Claims, 8 Drawing Sheets

(56) References Cited

U.S. PATENT DOCUMENTS

| | | | |
|---|---|---|---|
| 6,848,110 B2* | 1/2005 | Salmon | G06F 9/44521 |
| | | | 719/328 |
| 6,947,955 B2 | 9/2005 | Cox et al. | |
| 7,546,605 B1* | 6/2009 | Kruger | G06F 8/71 |
| | | | 719/316 |
| 2008/0250275 A1* | 10/2008 | Walker | G06F 11/3476 |
| | | | 714/45 |
| 2010/0017188 A1* | 1/2010 | Shaffer | G06F 8/36 |
| | | | 703/23 |
| 2010/0199259 A1* | 8/2010 | Quinn | G06F 9/44536 |
| | | | 717/106 |

OTHER PUBLICATIONS

"Augmenting Objects", Published on: Jun. 14, 2013, retrieved at <<http://dojotoolkit.org/documentation/tutorials/1.9/augmenting_objects/>>, 4 pages.

Barrett, et al., "Aspects—Composing CSCW Applications", In Proceedingsof International Conference on Object Oriented Information Systems, Dec. 18, 1995, 6 pages.

"Object-oriented programming", retrieved at <<http://en.wikipedia.org/wiki/Object-oriented_programming>>, Jun. 11, 2014, 10 pages.

* cited by examiner

TRANSPARENT TYPE-BASED OBJECT AUGMENTATION BY ORTHOGONAL FUNCTIONALITY

INCORPORATION BY REFERENCE

The present application claims priority to, and also incorporates by this reference the entirety of, U.S. provisional patent application 62/009,096 filed Jun. 6, 2014.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Object-oriented programming builds computer programs using objects, which are often instances of classes. Classes are defined using types, and in many implementations classes can inherit data and/or instructions from other classes. Objects have data fields, which are variously referred to as attributes, properties, or fields. Objects also have routines, which are variously referred to as functions, operators, procedures, or methods. Objects may model or represent things found in the real world.

Instead of organizing programs primarily as instructions and data, an object-oriented approach integrates instructions and data into objects which generally have both state (data) and behavior (instructions). As a result, object-oriented programming can facilitate software maintenance and upgrades by supporting encapsulation and information hiding. Defining software as modular components (objects) that support inheritance facilitates re-using components that already exist and extending components by defining new subclasses with specialized behaviors. An object-oriented approach encourages a developer to place data where it is not directly accessible by the rest of the system. Instead, data is accessed by calling object methods, which are tied to the data. An object's methods act as intermediaries for reading or writing the data they control.

SUMMARY

Some embodiments are directed to the technical problem of transparently augmenting functionality of objects in an existing collection of objects. Some augment functionality without damaging the pre-existing functionality, and/or augment functionality without relying on inheritance mechanisms or class specialization for the added functionality.

Some embodiments augment object functionality in a computational environment at least in part by automatically creating a dynamic interface T-interface for an object type T that is known to an application, e.g., declared in or explicitly imported into the application. The type T has a type signature and also has an indicated functionality in the environment; T is sometimes referred to herein as the indicated type. The created dynamic interface T-interface has the same type signature as the type T. By searching an augmentation registration structure, which is not necessarily a standard Microsoft® Windows® registry, for example, at least one augmented type T-augmentation is recognized which implements the dynamic interface T-Interface. (Microsoft® and Windows® are marks of Microsoft Corporation.) Upon execution in an adjusted environment, the augmentation provides only functionality that is orthogonal to the indicated functionality of type T, so the indicated type's functionality is not harmed. The computational environment is adjusted, e.g., by overriding a constructor for the type T, to provide an adjusted environment in which an instantiation of type T by an application program executing in the adjusted environment automatically generates an instance of the augmented type T-augmentation, and does so transparently to the application program.

In some embodiments, a program environment receives a request to make an instance of type T, e.g., a type constructor call invocation. The program environment may be an interpreted program environment, or a compiled program environment, for example. In response to the request, an embodiment generates in the environment, transparently to the application program, for each of a collection of registered augmentations, an instance of the augmentation. Each instance of the augmentation provides only functionality that is orthogonal to the indicated functionality of type T. After making an instance of the indicated type T, some embodiments return a composition of the registered augmentations and the instance in response to the request to make an instance of type T.

Some examples of orthogonal functionalities in a given embodiment may include: data logging, event logging, data validation, event validation, localization of strings, localization of a display format, administrator alerts, inspection of data without alteration of the data, malware scanning, scanning for a code security vulnerability, or reporting on one of the foregoing.

For example, suppose an overridden constructor for type T is invoked to create an object for sorting a list of records. The indicated sorting functionality may be transparently augmented by code that logs the data values sent and received for sorting and code that alerts an administrator by email or text message when a particular data value is seen. In this example, the application program that invoked the T constructor does not recite (explicitly know about) or rely upon (implicitly know about) the augmented functionality; the augmentation is thus transparent to the application.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Acronyms

Figure 1:
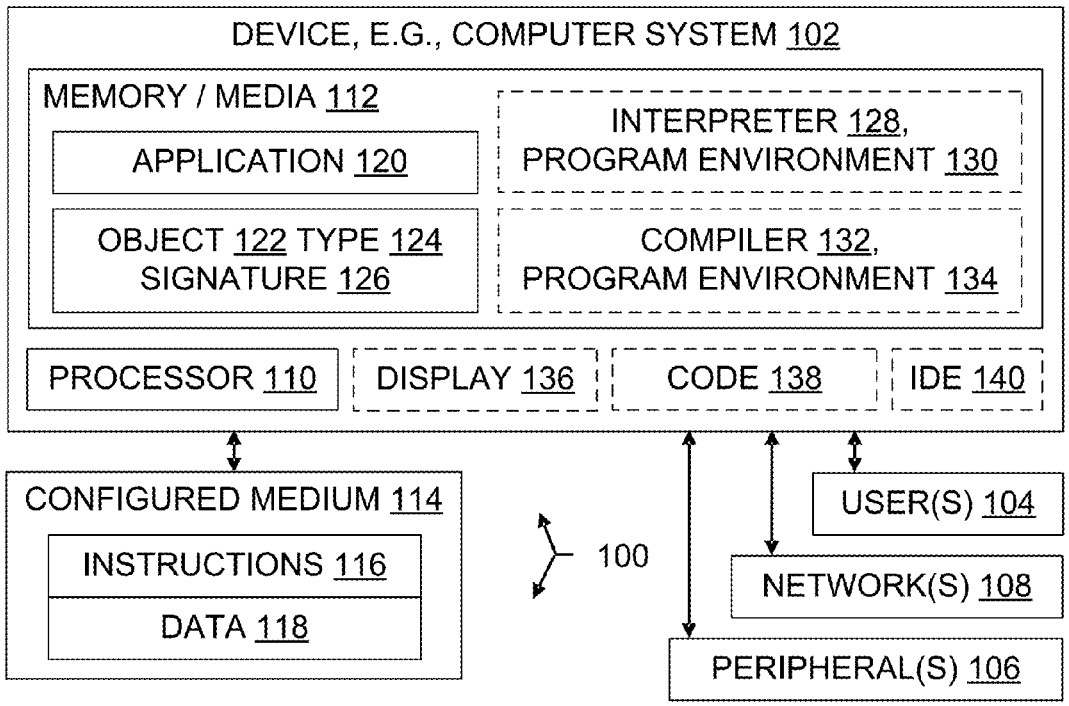
FIG. 1 is a block diagram illustrating a computer system having at least one processor and at least one memory which interact with one another under the control of software, and other items in an operating environment which may be present on multiple network nodes, and also illustrating configured storage medium embodiments.

Some acronyms are defined below, but others may be defined elsewhere herein or require no definition to be understood by one of skill.

ALU: arithmetic and logic unit
API: application program interface
CD: compact disc
CPU: central processing unit
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
OAS means object augmentation system
RAM: random access memory
ROM: read only memory
UCF means unified class factory Overview Some developers use or are guided by software development design patterns. The present disclosure described an innovative software development design pattern which implements an infrastructure component that supports adding general purpose value to the application in the pattern is realized, in a manner which is transparent to the application logic. Purposes to which the pattern and other innovations described herein may be applied are wide ranging.

Two examples of a problem space in which favorable technical results may be obtained by use of the teachings herein include logging application activity and validating application input and output. Such problem spaces have previously involved direct, ad-hoc approaches which are not transparent to the application logic, by requiring modifications to the application logic.

Some embodiments described herein may be viewed in a broader context. For instance, concepts such as data types, functionality, instantiation, normal execution, object orientation, and signatures may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving data types, functionality, instantiation, normal execution, object orientation, and/or signatures are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical challenges such as how to enhance object functionality without disrupting an existing application, and how to identify possible enhancements to object functionality. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein provide code for defining, registering, instantiating, and/or composing object augmentations. Third, technical effects provided by some embodiments include application-transparent augmentation of objects, and some effects include particular augmentations such as alerting, inspecting, localizing, logging, reporting, scanning, and/or validating data values accessed or produced by objects. Fourth, some embodiments include technical adaptations such as an augmentation registry, an augmentation library, and/or compositions of an indicated type with one or more object augmentations. Fifth, some technical results of some embodiments include improved development flexibility, and/or increased access to information about data which is read and/or written with existing object type instantiations.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adjusting, augmenting, composing, creating, generating, making, ordering, overriding, providing, receiving, recognizing, registering, returning, using, (and adjusts, adjusted, augments, augmented, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 have or use code such as objects 122. Each object 122 has a data type 124 which is characterized by a type signature 126. The application may be developed and/or executed using an interpreter 128 in an interpreted program environment 130, using a compiler 132 in a compiled program environment 134, or both. The applications 120, object 122, interpreter 128, compiler 132, other code 138, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation. In addition to processors 110 (CPUs, ALUs, FPUs, and/or GPUs), memory/storage media 112, display(s) 136, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

A given operating environment 100 may include an Integrated Development Environment (IDE) 140 which provides a developer with a set of coordinated software development tools such as compilers 132, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® and/or JavaScript® environments (marks of Oracle America, Inc.), and some include environments which utilize languages such as C++ or C# ("C-Sharp"), but teachings herein are applicable with a wide variety of programming languages, programming models, and programs.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

Systems

Figure 2:
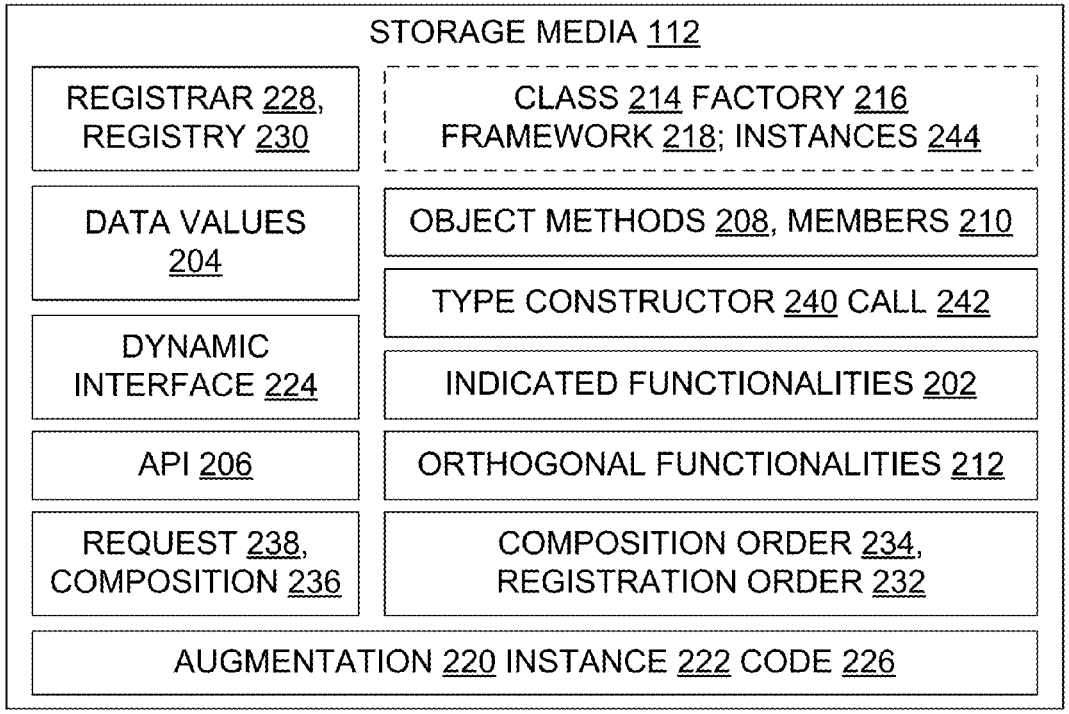
FIG. 2 is a block diagram illustrating aspects of transparent type-based object augmentation by orthogonal functionality in an example architecture.

FIG. 2 illustrates aspects of an architecture which is suitable for use with some embodiments. The objects 122 have respective so-called "indicated" functionalities 202 (also referred to as "original" functionalities) for representing, storing, and/or manipulating data values 204. These "indicated" functionalities are functionalities 202 indicated by APIs 206 which are consumed by applications 120, for example, and/or indicated within applications 120 by invocations of object methods 208 and/or by accesses of object members 210. The indicated functionalities 202 are integrated with, and intended to provide or support, the application's business logic. They are often specific to the application's field or area of operation (commercial, database, development, educational, energy, entertainment, financial, manufacturing, medical, real-time, scientific, search, security, etc.) and some of the functionalities 202 may well be specific to the application itself.

In contrast with the indicated functionalities 202, so-called "orthogonal" functionalities 212 are not indicated within production version of applications 120, are not intended to provide or directly support the application's business logic, and/or are not specific to the application's field or area of operation. Orthogonal functionalities are independent of the applications, in that the applications 120 were not designed or implemented with the orthogonal functionalities 212 in mind and the orthogonal functionalities 212 are not required for useful operation of the applications 120. However, in some embodiments the indicated functionalities 202, the orthogonal functionalities 212, or both, are implemented using a class factory framework 218, in which classes 214 implement object types 124 and objects 122 are produced at least in part using software factory 216 mechanisms.

In some embodiments, the orthogonal functionalities 212 are implemented as augmentations 220, in the form of instances 222 of dynamic interfaces 224. Execution of code 226 in the instances 222 provides the augmentation functionality.

In some embodiments, the augmentations are registered by a registrar 228 by being named, indexed into, or otherwise represented in an augmentation registry or library 230, in an interpreted environment 130 and/or a compiled environment 134. An augmentation registry 230 is not necessarily a Microsoft® Windows® registry (marks of Microsoft Corporation), and a registry 230 may be used in environments which do not include Microsoft® Windows® operating system or hypervisor code, and which do not include a conventional Windows® registry. In some embodiments the augmentation registrar 228 operates in the system as part of a class factory framework 218 in which object definitions are attached to named types.

Registration of multiple augmentations 220 inherently creates a registration order 232; this order 232 is the order in which the registrations occurred in time. But the registration order 232 is not necessarily the same as the execution order of multiple augmentations; that execution order is also referred to herein as the composition order 234. Execution order pertains to augmentation compositions 236. In response to an application request 238 which invokes a type constructor 240 on an indicated object type, augmentations 220 having orthogonal functionalities 212 may be composed with one another and with an object instance that has an indicated functionality 202 to thereby form a composition 236.

Some embodiments include a computer system 102 with a processor 110, and a memory 112 in operable communication with the processor. In some, an augmentation registrar 228 resides in the memory. The registrar 228 includes code which, upon execution with the processor, registers object type augmentations 220 in a computational environment 130 or 134 of the computer system. The system in this example embodiment also includes at least one object type T 124 having a type signature 126 that includes a constructor 240, zero or more members 210, and zero or more method 208 signatures. The object type T also has an indicated functionality 202. The system in this embodiment also includes at least one augmentation 220 which has been registered by the augmentation registrar 228. The augmentation has the same type signature as type T. Upon execution with the processor(s) 110, the augmentation provides only functionality 212 that is orthogonal to the indicated functionality 202 of type T; it does not provide any indicated functionality 202. Some embodiments also include at least one application program 120 which includes at least one call 242 to make an instance 244 of the object type T. The environment 130 or 134 is characterized in that execution of the call to make an instance of the object type T returns a composition of the registered augmentations with an instance 244 of type T, and does so transparently to the application (the application does not rely on or recite the augmentation).

In some embodiments, the registered augmentations 220 include at least one (or two, or three, etc. depending on the embodiment) of the augmentation codes 226 noted below.

Some augmentation codes 226 have functionality 212 which is orthogonal to the indicated functionality 202 of type T in that during normal execution data values 204 returned to the application program 120 via the augmentation code 226 are the same as data values 204 that would be returned to the application program 120 without the augmentation code 226 being present. "Normal" execution is execution of software that does not result in an exception, a hang, a memory access error, or a crash.

Some augmentation codes 226 have functionality 212 which is orthogonal to the indicated functionality 202 of type T in that the augmentation code 226 is limited to logging and reporting on said logging.

Some augmentation codes 226 have functionality 212 which is orthogonal to the indicated functionality 202 of type T in that the augmentation code 226 is limited to validation and reporting on said validation.

Some augmentation codes 226 have functionality 212 which is orthogonal to the indicated functionality 202 of type T in that the augmentation code 226 is limited to localization and reporting on said localization.

Some augmentation codes 226 have functionality 212 which is orthogonal to the indicated functionality 202 of type T in that the augmentation code 226 is limited to inspection of data without alteration of the data and reporting on said inspection.

Some augmentation codes 226 have functionality 212 which is orthogonal to the indicated functionality 202 of type T in that the augmentation code 226 is limited to malware scanning and reporting on said scanning.

Some augmentation codes 226 have functionality 212 which is orthogonal to the indicated functionality 202 of type T in that the augmentation code 226 is limited to scanning for a code security vulnerability and reporting on said scanning.

In some embodiments, augmentation codes 226 have functionality 212 which is orthogonal to the indicated functionality 202 of type T in that the type T is a not a base type from which any of the augmentations inherit.

In some embodiments, the environment 130 or 134 includes code which upon execution performs as follows. The code receives in the environment a request 238 to make an instance of type T. The code generates in the environment, transparently to an application program 120, for each of a collection of augmentations 220, an instance of the augmentation which provides only functionality 212 that is orthogonal to the indicated functionality of type T. Then the code returns a composition 236 of those augmentations with an instance of type T in response to the request.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, an application 120 with an indicated object type may invoked a type constructor on one device/system 102 in a networked cloud, leading to instantiation of augmentations 220 whose code 226 is at least partially stored on other devices/systems within the cloud.

Processes

Figure 3:
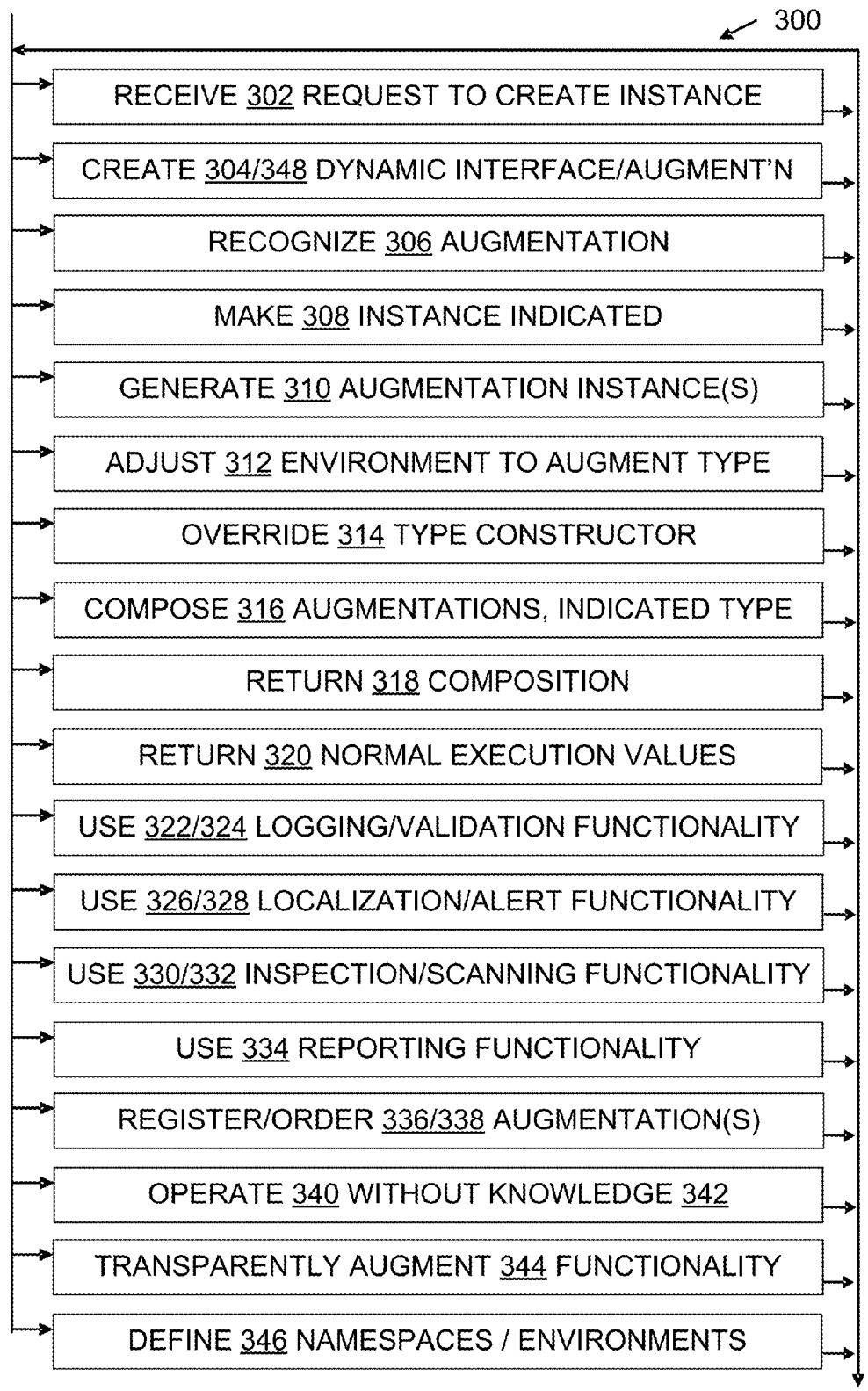
FIG. 3 is a flow chart illustrating steps of some process and configured storage medium embodiments.

FIG. 3 illustrates some process embodiments in a flowchart 300.

Technical processes shown in the Figures or otherwise disclosed may be performed in some embodiments automatically, e.g., by augmentation composing code requiring little or no contemporaneous live user input. Processes may also be performed in part automatically and in part manually by a developer unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Code such as a code 138 receives 302 in the environment a request 238 to make an instance of type T. An embodiment automatically creates 304 a dynamic interface 224 T-interface for an object type T in a computational environment 130 or 134. The type T has a type signature and also has an indicated functionality 202 in the environment. The created dynamic interface T-interface has the same type signature 126 as the type T. The embodiment recognizes 306 in the environment at least one augmented type T-augmentation 220 which implements the dynamic interface T-Interface, e.g., by a search and/or look-up mechanism. The augmentation 220 upon execution in an adjusted environment will provide only functionality 212 that is orthogonal to the indicated functionality 202 of type T. The system makes 308 an instance of type T, using familiar mechanisms. However, the system also generates 310 in the environment, transparently to the application program, an instance 222 of the augmentation 220; an instance may be generated 310 for each of a collection of registered augmentations, for example. The environment is adjusted 312 to generate the augmentation(s) in addition to making the expected instance; this may be accomplished, e.g., by overriding 314 a type constructor for type T with intervening code that recognizes 306 augmentations having the same signature as T, generates 310 their augmentation instances 222, calls the overridden constructor (from the standpoint of the original application code for T in terms of its indicated functionality) to make 308 an instance 244 of T, and composes 316 the T instance 244 with the augmentation instances 222 to be returned 318 in response to the request 238, instead of merely returning the T instance as a conventional system would have done. That is, an instantiation of type T by an application program 120 executing in the adjusted environment automatically generates an instance of the augmented type T-augmentation transparently to the application program. From a wider OAS perspective in some embodiments, an instance of a dynamic interface T-interface implements functionality to direct future method execution among the composed augmentations.

In some processes, functionality directed by the created 304 dynamic interface T-Interface is orthogonal to the indicated functionality of type T in that during normal execution data values returned 320 to the application program via the augmented type T-augmentation are the same as data values that would be returned to the application program without the augmented type T-augmentation. Normal execution is execution of software that does not result in at least one of the following: an exception, a hang, a memory access error, or a crash.

In some processes, functionality directed by the created 304 dynamic interface T-Interface is orthogonal to the indicated functionality of type T in that the dynamic interface T-Interface is limited to one or more of the following functionalities 212: data logging 322, event logging 322, data validation 324, event validation 324, localization 326 of strings, localization 326 of a display format, administrator alerts 328, inspection 330 of data without alteration of the data, malware scanning 332, scanning 332 for a code security vulnerability, or reporting 334 on one of the foregoing. For convenience, these orthogonal functionalities and steps which perform or use them are all referred to using a given reference numeral. Thus, reference numeral 322 refers to code that provides logging functionality, to the use of logging functionality by other code, and/or to the execution of logging functionality code. Similarly, reference numeral 324 refers to code that provides validation functionality, to the use of validation functionality by other code, and/or to the execution of validation functionality code, and so on for the other reference numerals 326 through 334.

In some processes, an environment provides a software development framework 218 which is at least partially consumed by the application program 120, and the application program operates 340 without any implicit or explicit knowledge 342 of an augmentation being indicated in the application 120. Explicit knowledge 342 in such situations is indicated by an express recitation of the augmentation's members 210 or methods 208 directly in the application program, e.g., T.augmentation_logging.flush( ) or print (T.augment_1.isValid). Implicit knowledge 342 in such situations is indicated by reliance on the augmentation in the application program, e.g., omitting a check to prevent division by zero or an array bounds check in the application based on the assumption that the check was made earlier by an augmentation. In some embodiments, the type T is a not a base type from which one or more of the registered augmentations inherit.

Some processes include registering 336 a single augmentation, while others include registering 336 a plurality of augmented types in the environment. When multiple augmentations are registered, some processes order 338 them for execution purposes only according to when they were registered, while other processes also permit ordering 338 augmentations for execution in an order 234 that need not match their registration order 232. Thus, some processes impose 338 a composition order 234 on at least two of the plurality of augmented types in the environment, the composition order indicating the relative order of execution of the augmented types in response to an invocation of a method of the type T by the application program. The registered augmentations for type T which were registered in a registration order 232 may also have a composition order 234 which is not the registration order and is not the registration order in reverse. Some processes compose 316 all registered augmentations having a given signature with each type in the environment that has that signature.

In some embodiments, a distinction is made between the method and property signature that a dynamic interface specifies (these are attributes an interface has), and the behavior of the internally generated instance of the dynamic interface that does the work of composition among the instantiated T-Augmentation<N>'s. Some may see a rough correspondence between this and a procedure parameter list and body, and a distinction away from the dynamic interface itself may be made. Some may make a distinction between a procedure parameter list and the procedure's body, for example. That is, a distinction between the data types of values expected and what is actually done with values of those data types after the values are received. In some embodiments, orthogonal functionality includes functionality of an implementation body which receives values having data types specified by the dynamic interface T-interface.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as augmentations 220, codes with orthogonal functionalities 212, composition orders 234, an augmentation registrar 228, and/or an augmentation registry 230, in the form of data 118 and instructions 116, read from a removable medium 114 and/or another source such as a network connection, to form a configured medium. The configured medium 112 is capable of causing a computer system to perform technical process steps for transparent type-based object augmentation by orthogonal functionality as disclosed herein. The Figures thus help illustrate configured storage media embodiments and process embodiments, as well as system and process embodiments. In particular, any of the process steps illustrated in FIGS. 3, 5, 7, 8, and/or 9, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived in part from "Rich Canvas" documentation. "Rich Canvas" is a name used internally to designate a program implemented by Microsoft Corporation; the actual name(s) of related product(s) may differ, and in particular may include or designate third party brands, e.g., Microsoft partner's brands. In some cases, a primary indicated functionality of such a product will be displaying merchant/partner catalogs to end-users. Aspects of the Rich Canvas program(s) and/or documentation, and of related software or documentation, are consistent with or otherwise illustrate aspects of the embodiments described herein. However, it will be understood that Rich Canvas and related software documentation and/or implementation choices do not necessarily constrain the scope of such embodiments, and likewise that Rich Canvas and related software and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Rich Canvas Background

The Rich Canvas Windows® 8.1 Application codebase is built on a set of JAVASCRIPT® infrastructure code which has been referred to with the codename "Phoenix" and will be referred to here as "infrastructure code" (Windows is a mark of Microsoft Corporation; JAVASCRIPT is a mark of Oracle America, Inc.). The infrastructure code was designed and developed with a number of specific principles in mind, including simplification of behaviors that are to be controlled explicitly by an application developer, to facilitate a cleaner and more maintainable set of code and a more robust application.

Class Factory in the Infrastructure Code

A Unified Class Factory (UCF) is described below. The UCF is a foundational software technology for applications which provides a platform and interface from which objects 122 are defined and instantiated, their lifetimes are established and controlled, and the runtime behavior of the objects is selectively and transparently augmented 344. An object-oriented programming paradigm for applications is used, together with the related items such as constructors, methods, object definitions, and types. The term "Unified" refers to a purpose for the Factory 216, which is to unify the behavior of objects which are encapsulated in the application 120. The UCF framework 218 provides an extensible object augmentation system, as discussed herein.

An Object Augmentation Approach

Along with object lifetime primitives, the UCF includes tools and techniques through which a wide variety of orthogonal behaviors can be added to the objects instantiated within the factory 216. Behaviors are added through signature preserving augmentations 220 of the object definition; the definition includes the constructor 240, members 210, and methods 208 (both class and instance methods). This augmentation system is designed to be transparent to the application 120 in the sense that, once an augmentation is in place, the behaviors it adds are orthogonal to the original behavior of the affected objects. Thus, application code which interacts with the objects does so without any need for adjustment or knowledge.

This UCF allows applications to define 346 namespaces or environments within which object definitions are attached to named types. In addition to establishing explicit namespaces, the environment also establishes a partitioned context within which the augmentation system takes effect.

This augmentation system works by allowing a set of system or application defined augmentations 220 to run over the set of object definitions that are made within a particular environment. Augmentations are registered 336 against an environment. Every registered augmentation runs in sequence against every object definition which is added to the environment, in this implementation.

In this example, a single augmentation 220 takes as input the object prototype, extends the methods thus discovered to perform whatever orthogonal behavioral augmentations it implements, and returns the modified object prototype with the same signature. This methodology works seamlessly in an interpreted programming environment 130 where object definitions are available for inspection and submission at runtime. In compiled programming environments 134, object definitions are inspected and internalized for realization at compile time. Specialized tooling 138 extends the compiler or preprocessor programs to realize the transformation in such environments 134. A result of this process is that a newly augmented type with the same underlying type interface is generated 310. Because augmentations 220 in this example run in sequence when composed 316, the behavioral modifications from one augmentation in the sequence are carried over to the next augmentation, as the output of each augmentation step is passed as input into the next. The potential usage of this augmentation scheme is open ended, although the augmentations themselves retain the original object method and constructor signature.

Two examples of realized usages follow. The first is an object activity logging 322 system, which is realized through augmentation by replacing each method in the object prototype (a.k.a. an indicated object) with a new method with the same signature that performs these steps:
1. Logs the original method name and incoming argument values
2. Invokes the underlying, original method from the incoming object
3. Logs the result of executing step 2
4. Returns the result of executing step 2

From the application standpoint, a logging 322 augmentation 220 would be a behavior which comes for free, with no need to litter either the code within the object implementation or the consuming code with logic to carry out the logging. Hence, the application code can operate 340 completely oblivious to the presence of these augmentations. Further, because the incoming object prototype in step 2 may be the output of an earlier transformation, transformations naturally compose.

The second example is a validation 324 system. Given an externally defined schema of constraints on input and output, the validation system confirms at each execution entry point that relevant constraints are met. Such a validation system can be embodied as an augmentation 220 in a manner analogous in structure with the logging system. Methods in the incoming object prototype are replaced 312 with code which first performs validation 324 on the input argument values, invokes the original methods, and then validates the output value(s) before returning them to the calling context.

Figure 4:
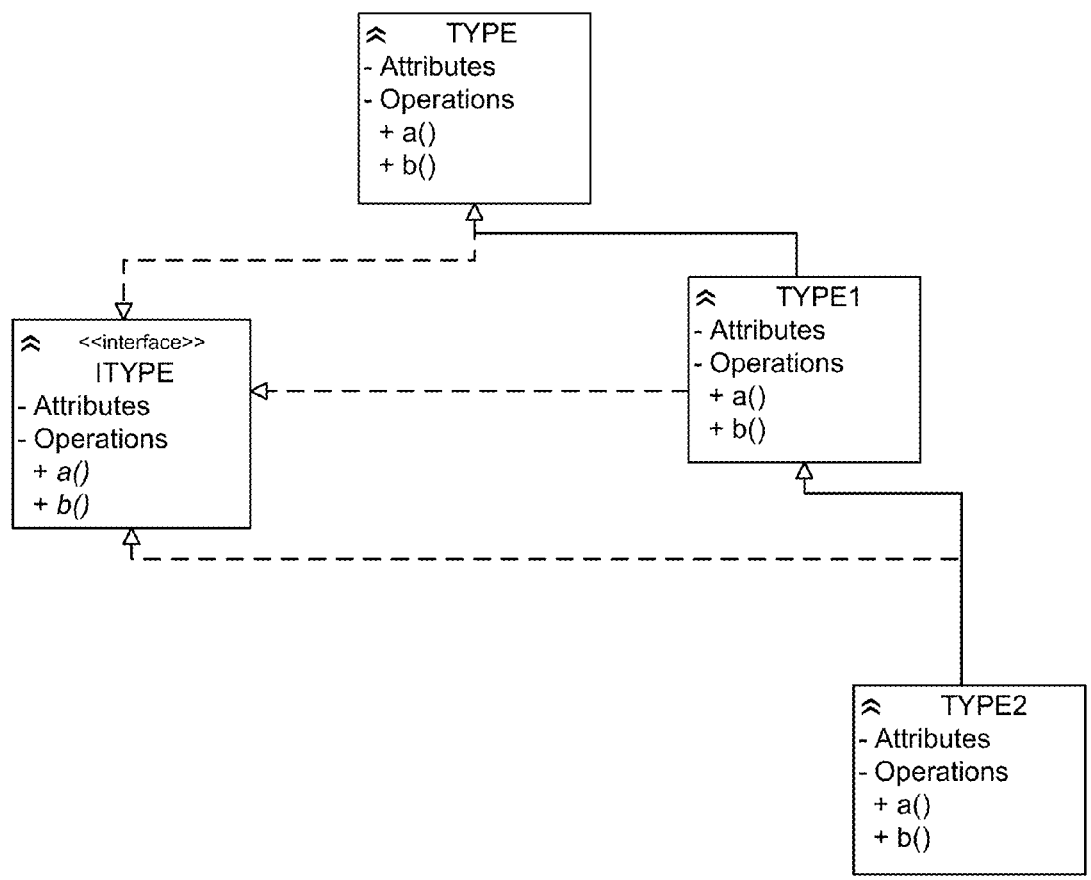
FIG. 4 is a class structure diagram for some embodiments illustrating augmentation of a particular type, designated as TYPE, by two augmented types, designated as TYPE1 and TYPE2, which are created internally.
Figure 5:
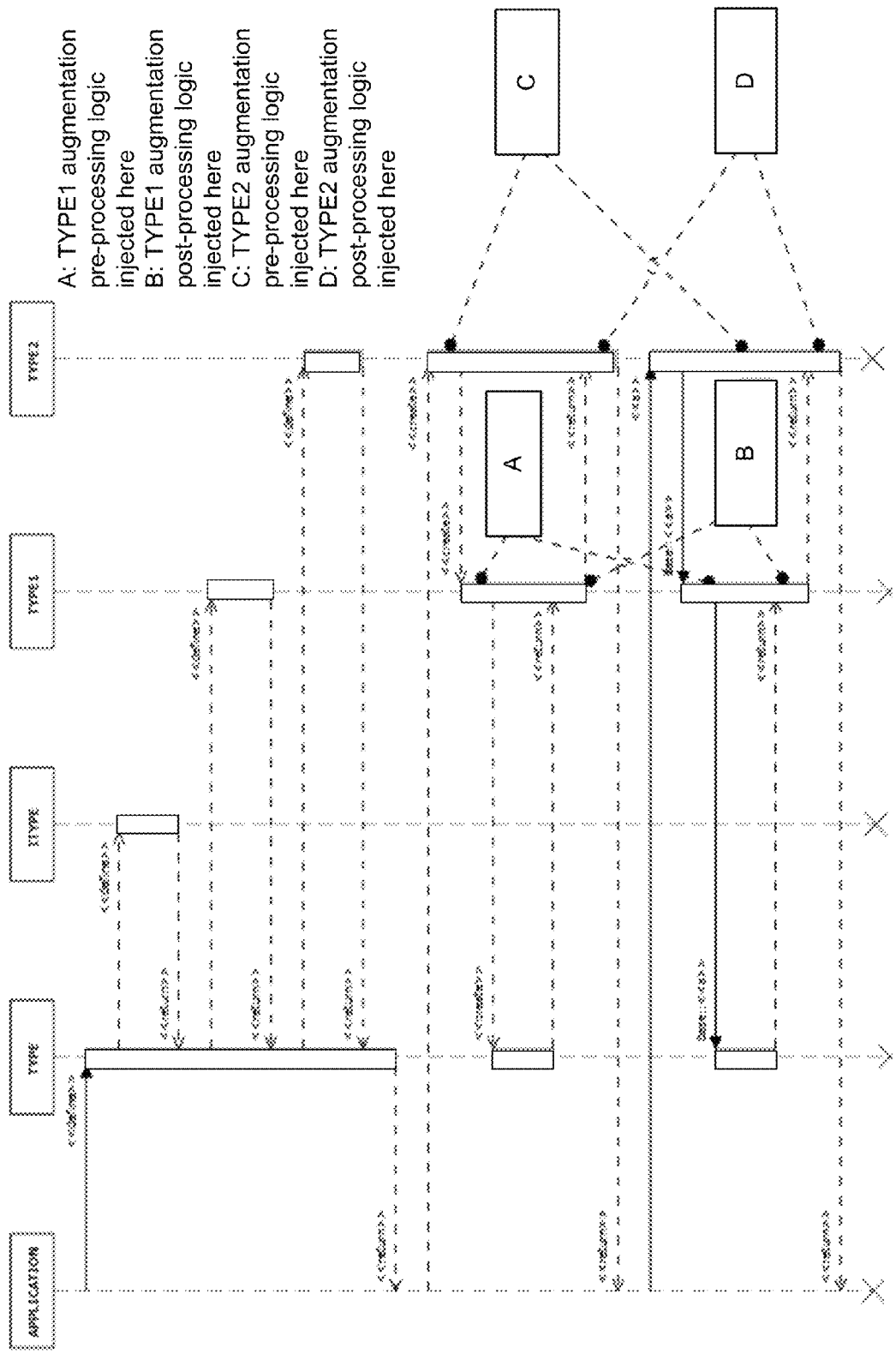
FIG. 5 is a sequence diagram illustrating runtime behavior through which the TYPE shown in FIG. 4 is augmented at definition-time, so that its corresponding instance runtime behavior will be augmented when an application instantiates and uses TYPE.

The diagrams shown in FIGS. 4 and 5 help illustrate augmentation in the case of a particular type, designated as TYPE in these diagrams, which is defined by application code. Under the example illustrated, two augmentations are envisioned, and hence there are two augmented types, designated as TYPE1 and TYPE2, which are created internally. The augmentations can be thought of as carrying out independent activities such as the logging system and the validator described above.

FIG. 4 depicts the original type TYPE in the topmost box, with no Attributes in this example and with two Operations denoted a( ) and b( ); in other examples original (a.k.a. indicated) types 124 may have different attributes (members) and/or different operations (methods). In this example the resulting augmentation-derived types are denoted TYPE1 and TYPE2. They follow the same behavioral interface (ITYPE) implicit in TYPE. Thus, TYPE, TYPE1, TYPE2, and ITYPE all have the same attributes and the same operators as one another. The example interface 224 which is implicit in TYPE has two methods, denoted a( ) and b( ). Dashed arrows from TYPE1 and TYPE2 to ITYPE denote their generation 310 from ITYPE. A dashed arrow from TYPE to ITYPE denotes the creation 304 of interface ITYPE from indicated type TYPE. Finally, solid arrows from TYPE2 to TYPE1 and from TYPE1 to TYPE denote the composition order 234: TYPE2 then TYPE1 then TYPE.

FIG. 5 depicts a sequence of actions involving items (named at the top from left to right) APPLICATION, TYPE, ITYPE, TYPE1, and TYPE 2. Starting with the top left solid arrow, the APPLICATION makes a call to define TYPE. The dashed arrow from TYPE to ITYPE denotes a call to define (create 304) ITYPE, with a corresponding return dashed arrow from ITYPE to TYPE. Similar dashed arrow pairs from TYPE to TYPE1 and back, and from TYPE to TYPE2 and back, denote calls to define (create 348) TYPE1 and TYPE2. Then a dashed arrow from TYPE denotes a return back to APPLICATION.

Next, a dashed arrow from APPLICATION to TYPE2 labeled "<<create>>" denotes generation 310 of a TYPE2 augmentation instance. As denoted by the dashed line from a comment box ending in a dot under TYPE2, any TYPE2 augmentation pre-processing logic (code) is injected at this point. A dashed arrow from TYPE2 to TYPE1 labeled "<<create>>" then denotes generation 310 of a TYPE1 augmentation instance. As denoted by the dashed line from a comment box ending in a dot under TYPE1, any TYPE1 augmentation pre-processing logic (code) is injected at this point. Then a dashed arrow from TYPE1 to TYPE labeled "<<create>>" then denotes making 308 a TYPE instance. The next lower dashed arrow from TYPE back to TYPE1 is a return, labeled "<<return>>". As denoted by the dashed line from a comment box ending in a dot under TYPE1, any TYPE1 augmentation post-processing logic (code) is injected at this point. The next lower dashed arrow from TYPE1 back to TYPE2 is a return, labeled "<<return>>". As denoted by the dashed line from a comment box ending in a dot under TYPE2, any TYPE2 augmentation post-processing logic (code) is injected at this point. As denoted by the dashed arrow from TYPE2 back to APPLICATION labeled "<<return>>", control then returns to the application.

Next, a solid arrow from APPLICATION to TYPE2 labeled "<<a>>" denotes an effort by the application to invoke TYPE's a( )method. First, TYPE2 a( ) is invoked. Then, as denoted by a solid arrow from TYPE2 to TYPE1 labeled "base::<<a>>" TYPE1's a( ) is invoked. As denoted by the dashed line from a comment box ending in a dot under TYPE1, any TYPE1 augmentation pre-processing logic (code) is injected at this point. Then, as denoted by a solid arrow from TYPE1 to TYPE labeled "base::<<a>>" TYPE's a( ) is invoked. The next lower dashed arrow from TYPE back to TYPE1 is a return, labeled "<<return>>". As denoted by the dashed line from a comment box ending in a dot under TYPE1, any TYPE1 augmentation post-processing logic (code) is injected at this point. The next lower dashed arrow from TYPE1 back to TYPE2 is a return, labeled "<<return>>". As denoted by the dashed line from a comment box ending in a dot under TYPE2, any TYPE2 augmentation post-processing logic (code) is injected at this point. Finally, as denoted by a dashed arrow from TYPE2 to APPLICATION labeled "<<return>>", control returns to the application.

In other words, FIG. 5 is a sequence diagram which illustrates augmentations of runtime behavior of TYPE. The runtime behavior through which TYPE is augmented 344 at definition-time is illustrated; TYPE's correspondingly augmented runtime behavior can be performed during the time the application 120 instantiates and uses TYPE. The application code proceeds unaware of the existence of TYPE1 and TYPE2. As far as it is concerned, it has simply instantiated a TYPE and called a single method on it.

The comment boxes shown in FIG. 5 represent behavior that the augmentations inject at the beginning and end of each method (and the constructor). From the standpoint of the first augmentation's implementation for method a( ), it operates on an object instance that is an ITYPE, but in actuality is an instance of TYPE2, after the second augmentation's implementation has already finished whatever pre-processing it performs. Conversely, from the standpoint of the second augmentation's implementation for method a( ), it operates on an ITYPE object instance, and it carries out its post-processing operations after the first augmentation has completed its post-processing. The nesting of augmentation behaviors is depicted graphically in the diagram.

OAS Example

By way of further illustration, consider an object augmentation system, also referred to as OAS, which defines and implements a software infrastructure component through which the runtime behavior of the objects involved in an executing application is selectively and transparently augmented. Users 104 of the OAS include, for instance, application developers having a purpose in mind to add functionality that is orthogonal to the application 120 itself. A functionality 212 that is orthogonal in this sense includes one which is fulfilled as an added value to a complete application and performs actions which are auxiliary to the application. Normally such functionalities are realized by directly modifying the application logic at specifically crafted points in the code such that the purpose in mind is thereby realized. Because the application logic is normally modified for this purpose, such previously used approaches are not transparent. When such auxiliary purposes are envisioned, especially in efforts that involve multiple, independent purposes, a marked decrease in maintainability of the code is an important cost that comes to bear. A realization of these kinds of purpose in an application via the OAS may be referred to as an "augmentation". The OAS allows multiple, independent augmentations to be composed in a transparent manner.

The OAS may be implemented through signature-preserving augmentations of the object definition, e.g., the constructor, members, and methods (both class and instance methods). Since the OAS is designed to be transparent to the application 120 in the sense that, once an augmentation is in place, the behaviors it adds are orthogonal to the original behavior of the affected objects, application code which interacts with the objects does so without any need for adjustment or knowledge.

The OAS may be implemented as part of a Unified Class Factory (UCF) framework 218. The UCF allows applications to define namespaces or environments within which object definitions are attached to named types. In addition to establishing explicit namespaces, the environment thus defined also establishes a partitioned context within which the augmentation system takes effect.

The OAS may work by a providing a registration mechanism whereby individual augmentations are introduced to the system. Registration 336 will occur as one of the first steps during application initialization, before the UCF begins to instantiate any application objects over which the augmentations are designed to operate. Every augmentation 220 registered in an environment runs in sequence against every object definition which is added to the environment, in some embodiments. In others, developers can opt-in or opt-out augmentations.

In some embodiments, an single augmentation 220 takes as input the incoming object prototype, extends the methods thus discovered to perform whatever behavioral augmentation it implements, and returns the modified object prototype with the same signature. A result is that a newly augmented type with the same underlying type interface is generated. Because augmentations run in sequence, the behavioral modifications implied by one augmentation in the sequence is carried over to the next one, as the output of each step is passed as input into the next.

Potential augmentations are limited in this example by the constraint that the augmentations retain the original object method and constructor signature and by the constraint that the states of the objects being augmented remain unchanged by the augmentations. To ensure the augmentation 220 can be transparent to the application code, it will not affect the computation (runtime control flow logic) of the application 120 in any way perceptible to an end-user 104. The same constraint also ensures that multiple, independent augmentations can be automatically composed 316 without one augmentation affecting the behavior of other augmentations.

One example is an object activity logging system, which is realized through augmentation by replacing each method in the object prototype with a new method with the same signature that follows these steps: (1) Logs the original method name and incoming argument values, (2) Invokes the underlying, original method from the incoming object prototype, (3) Logs the result of executing step 2, and (4) Returns the result of executing step 2. From the application standpoint, a logging augmentation would be a behavior which comes for free, with no need to litter the code (either the code within the object implementation or consuming code) with logic for carrying out the logging. Hence, the application code can be completely oblivious to the presence of these augmentations. Further, because the incoming object prototype in step 2 may be the output of an earlier transformation, transformations naturally compose.

A second example is a validation system. Given an externally defined schema of constraints on input and output, the validation system confirms at each execution entry point that relevant constraints are met. Such a validation system is embodied as an augmentation in a manner completely analogous in structure with the logging system. Methods in the incoming object prototype are replaced with code which first performs validation on the input argument values, invokes the original methods, and then validates the output value(s) before returning them to the calling context.

The diagrams which appear in FIGS. 6 through 9 illustrate the concept of augmentation in the case of a particular type, which is designated as Type in the diagrams, and is defined by application 120 code. Under the example illustrated, two augmentations are envisioned, and hence there are two augmented types, which are designated in the Figures and this portion of the text as TypeAugmentation_1 and TypeAugmentation_2, and which are created internally and automatically. These augmentations can be thought of as carrying out independent activities such as the logging system and the validator described above.

Figure 6:
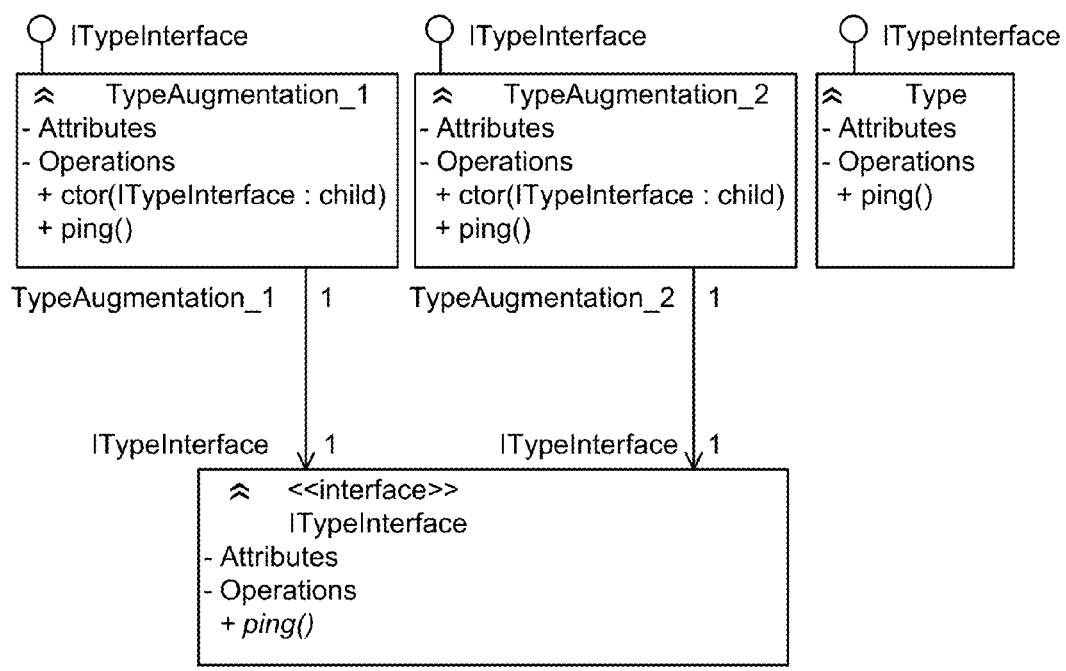
FIG. 6 is a class structure diagram, similar in some respects to the diagram shown in FIG. 4, but illustrating augmentation of another particular type, which is designated as Type, by two augmented types, which are designated as TypeAugmentation_1 and TypeAugmentation_2.

FIG. 6 depicts the original type (Type) and the augmented types which follow the same behavioral interface (ITypeInterface) implicit in Type. In this simple case, ITypeInterface consists of a single method, ping. TypeAugmentation_1 and TypeAugmentation_2 implement ITypeInterface. Instances of the augmented types have a 1-1 association with an ITypeInterface instance. This association provides a mechanism for composition of augmentations in a seamless manner.

Figure 7:
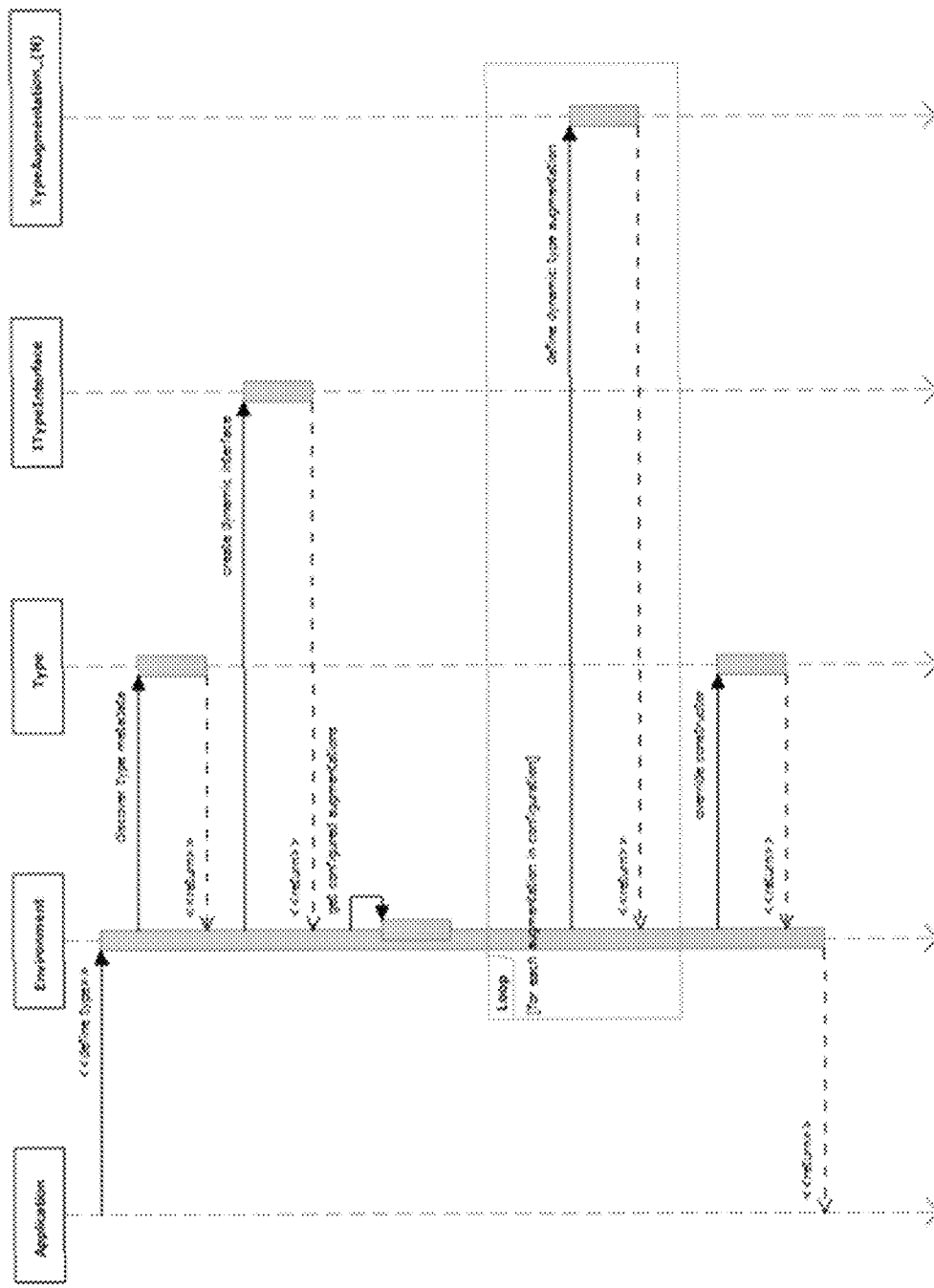
FIG. 7 is a sequence diagram illustrating a sequence in which Type (shown in FIG. 6) is augmented at definition-time, resulting in creation of a dynamic interface (ITypeInterface) and an augmented type for each configured augmentation.

FIG. 7 is a sequence diagram which illustrates the manner in which Type is augmented 344 at definition-time resulting in the creation 304 of the dynamic interface (ITypeInterface) and an augmented type for each configured augmentation. Arrows in the diagram include in sequence a solid "<<define type>>" arrow from Application to Environment, solid arrow "discover type metadata" from Environment to Type, dashed arrow "<<return>>" from Type to Environment, solid arrow "create dynamic interface" from Environment to ITypeInterface, dashed "<<return>>" arrow from ITypeInterface to Environment, solid arrow "get configured augmentations" from Environment to itself, then inside a Loop "[for each augmentation in configuration]" a solid arrow "define dynamic type augmentation" from Environment to TypeAugmentation_(N) and a dashed arrow "<<return>>" back to Environment, solid "override constructor" arrow from Environment to Type and a dashed arrow "<<return>>" back to Environment, and a dashed arrow "<<return>>" from Environment back to Application.

As illustrated in FIG. 7, the environment processing that occurs at definition-time modifies 312 metadata attached to the name Type in the environment such that when an instantiation is made in application code, ostensibly of Type, an ITypeInterface is instantiated instead. The process in this example involves (a) discovering the metadata of Type, i.e., the methods, constructors, and properties of the type involved; (b) creating the associated dynamic interface ITypeInterface; (c) creating an augmented type which implements ITypeInterface for each configured augmentation; and (d) adjusting 312 the metadata assigned to the name Type in the environment 130 or 134 so that instantiations to that type name will receive an internally generated instance of ITypeInterface which directs the runtime behavior so as to put into effect each configured augmentation 220 in concert.

Figure 8:
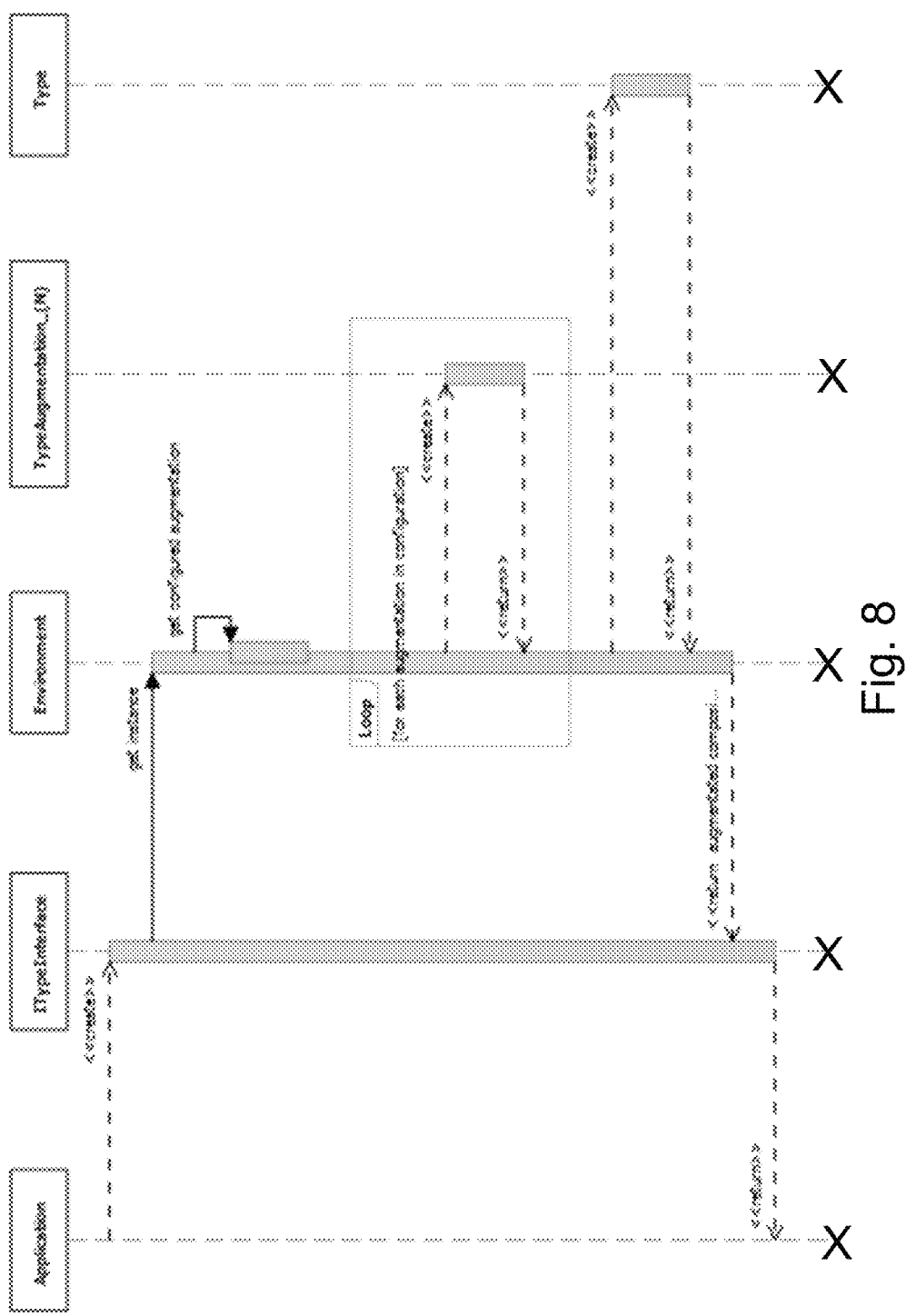
FIG. 8 is a sequence diagram illustrating behavior involved when an application instantiates what it expects to be an instance of the Type shown in FIG. 6, that is, when the application instantiates what would be—in the absence of the augmentation—merely an instance of Type.

FIG. 8 depicts the behavior involved when the application code instantiates what it expects to be an instance of Type. The first type that is instantiated is an internal ITypeInterface that directs augmentation (mentioned above), per a dashed "<<create>>" arrow from Application to ITypeInterface. A solid "get instance" arrow flows from ITypeInterface to Environment. A solid arrow "get configured augmentation" then flows from Environment to itself. Instances of each augmented type (TypeAugmentation_1, TypeAugmentation_2, . . . , TypeAugmentation_N) are created as well as an instance of the original Type. A loop is indicated in FIG. 8 with a <<create>> and <<return>> dashed arrows pair inside a Loop box labeled "[for each augmentation in configuration]". Dashed arrows flow from Environment to Type ("<<create>>"), from Type back to Environment ("<<return>>"), from Environment back to ITypeInterface ("<<return augmented composite>>"), and from ITypeInterface back to Application ("<<return>>"). Thus, the director links these type instances together to make a composite 236 instance wherein each of the component instances' constructor is given an instance pointer to the next ITypeInterface in the chain. The inner-most component instance is of the original Type. It is fed as the ITypeInterface to the instance of TypeAugmentation_1, which is fed as the ITypeInterface to the instance of TypeAugmentation_2, and so on. The composite instance dispatches every method to the outermost component instance of ITypeInterface which would be an instance of TypeAugmentation_N. The composite instance is returned to the application code which proceeds unknowingly to treat it as an instance of Type.

Figure 9:
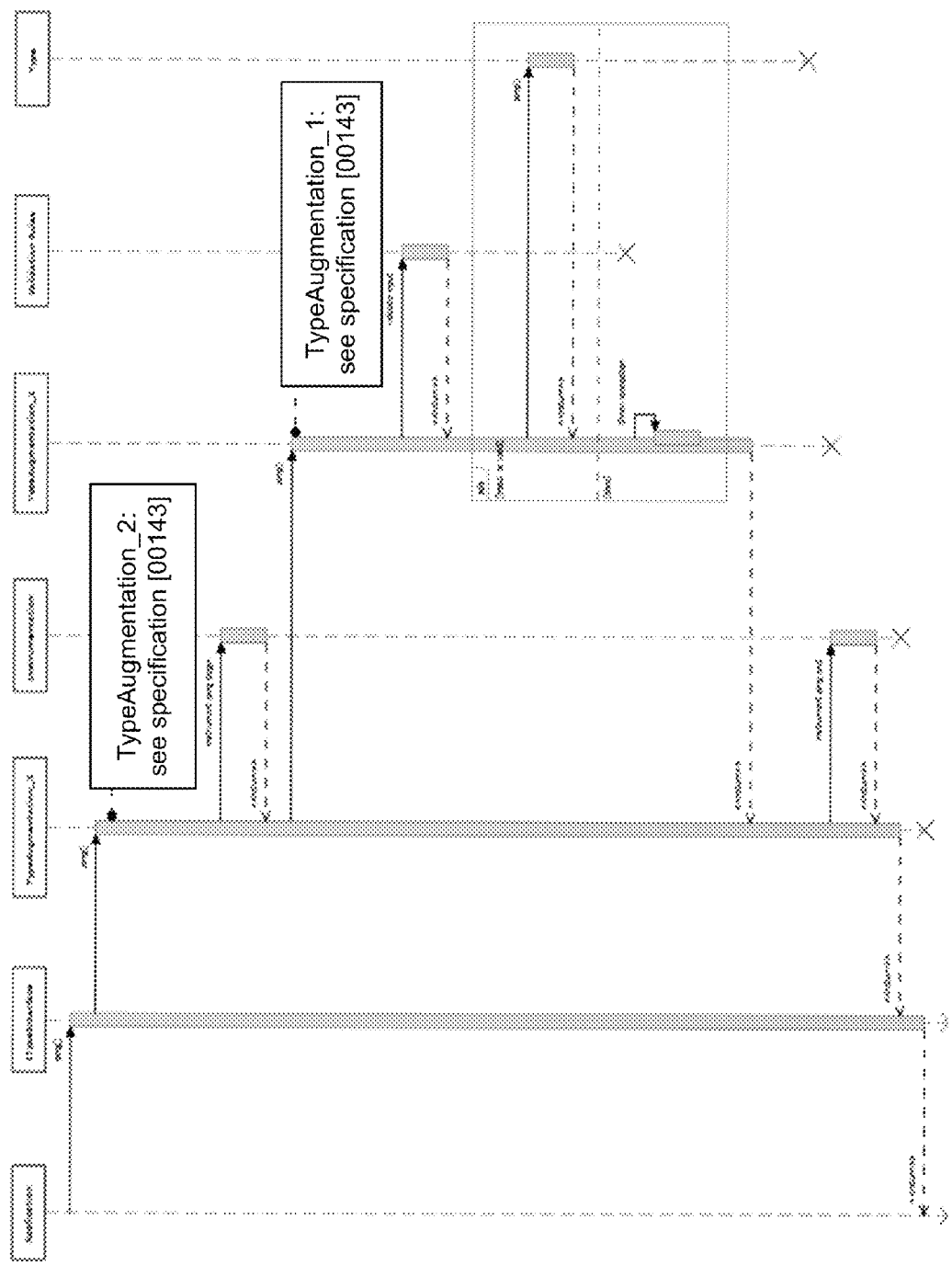
FIG. 9 is a sequence diagram illustrating behavior involved when the application of FIG. 8 calls a method ping on an instance of the Type shown in FIG. 6 which the application constructed earlier.

FIG. 9 illustrates the behavior involved when the application code calls a method, ping, on an instance of Type that it had earlier created. In this illustration, two augmentations 220 are configured in the environment, one which performs input and output validation 324 and another which logs 322 activity. The application's invocation of ping on its instance executes the implementation of ping in the composite instance of ITypeInterface which was returned to the application when it instantiated a Type. This simply dispatches to the outermost augmented type, TypeAugmentation_2, which carries out its augmentation behavior, in this example logging 322 the beginning of current method activity, then dispatching to the next augmented type, then logging 322 the end of current method activity and returning. Embedded within this was the behavior of the next augmented type, TypeAugmentation_1, which is the validator which checks 324 input and either dispatches to the next augmented type or throws an error depending on the validation outcome. In this example, the final augmented type is the instance of the original Type which carries out its original ping activity and returns.

Accordingly, the flow of arrows and other aspects of FIG. 9 include the following in sequence: solid arrow from Application to ITypeInterface labeled "ping( )", solid arrow from ITypeInterface to TypeAugmentation_2 labeled "ping( )", comment box with dashed line ending in dot at TypeAugmentation_2 stating "TypeAugmentation_2 represents the second dynamic augmentation type created to wrap the original definition. In this specific scenario, it provides instrumentation code for the duration of the underlying method call.", solid arrow from TypeAugmentation_2 to Instrumentation labeled "instrument ping begin", dashed arrow from Instrumentation to TypeAugmentation_2 labeled "<<return>>", solid arrow from TypeAugmentation_2 to TypeAugmentation_1 labeled "ping( )", comment box with dashed line ending in dot at TypeAugmentation_1 stating "TypeAugmentation_1 represents the first dynamic augmentation type created to wrap the original definition. In this specific scenario, it provides input/output validation code for the underlying method call.", solid arrow from TypeAugmentation_1 to Validation Rules labeled "validate input", dashed arrow from Validation Rules to TypeAugmentation_1 labeled "<<return>>", box labeled Alt spanning TypeAugmentation_1 and Validation Rules and Type with "[input is valid] portion having solid arrow from TypeAugmentation_1 to Type labeled "ping( )" and dashed "<<return>>"" arrow back to TypeAugmentation_1 and having "[else]" portion with solid arrow from TypeAugmentation_1 to itself labeled "throw exception", dashed "<<return>>"" arrow from TypeAugmentation_1 back to TypeAugmentation_2, solid arrow from TypeAugmentation_2 to Instrumentation labeled "instrument ping end", dashed arrow from Instrumentation to TypeAugmentation_2 labeled "<<return>>", and finally a dashed "<<return>>" arrow from TypeAugmentation_2 to ITypeInterface.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3, 5, 7, 8, and 9 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computational process for augmenting object functionality, comprising:
    automatically creating a dynamic interface T-interface for an object type T in a computational environment which includes a memory and at least one processor, the type T having a type signature and also having an indicated functionality in the environment, the dynamic interface T-interface when created having the same type signature as the type T;
    recognizing by computation in the environment at least one augmented type T-augmentation which implements the dynamic interface T-Interface and which upon execution in an adjusted environment provides only functionality O that is orthogonal to the indicated functionality of type T in at least one of the following ways: functionality O is not indicated within a production version of an application having functionality of type T, functionality O does not directly support the application, functionality O is not specific to a field of operation of the application, functionality O is fulfilled as an added value to the application and performs actions which are auxiliary to the application; and
    adjusting the computational environment to provide an adjusted environment in which an instantiation of type T by an application program executing in the adjusted environment automatically generates an instance of the augmented type T-augmentation supporting functionality O transparently to the application program, the process being performed without modifying the application program in that behavior is added through signature preserving augmentation of a definition of an object of type T, the definition including one or more of a constructor, members, and methods within a namespace in which object definitions are attached to named types.

2. The process of claim 1, wherein functionality O directed by the dynamic interface T-Interface is orthogonal to the indicated functionality of type T in that during normal execution data values returned to the application program via the augmented type T-augmentation are the same as data values that would be returned to the application program without the augmented type T-augmentation, where normal execution is execution of software that does not result in an exception, a hang, a memory access error, or a crash.

3. The process of claim 1, wherein functionality O directed by the dynamic interface T-Interface is orthogonal to the indicated functionality of type T in that the dynamic interface T-Interface is limited to one or more of the following functionalities: data logging, event logging, data validation, event validation, localization of strings, localization of a display format, administrator alerts, inspection of data without alteration of the data, malware scanning, scanning for a code security vulnerability, or reporting on one of the foregoing.

4. The process of claim 1, wherein adjusting the environment comprises overriding a constructor for the type T.

5. The process of claim 1, wherein the environment provides a software development framework which is at least partially consumed by the application program as a consumer, and wherein the application program operates without any implicit or explicit knowledge of the augmented type T-augmentation being indicated in the consumer.

6. The process of claim 1, further comprising registering a plurality of augmented types in the environment.

7. The process of claim 6, further comprising imposing a composition order on at least two of the plurality of augmented types in the environment, the composition order indicating the relative order of execution of the augmented types in response to an invocation of a method of the type T by the application program.

8. A computer-readable storage medium configured with data and with instructions that when executed by at least one processor causes the processor(s) to perform a technical process for augmenting object functionality in a computational environment which includes a memory and at least one processor, the process comprising the steps of:
  automatically creating a dynamic interface T-interface for an object type T, the type T having a type signature and also having an indicated functionality in the environment, the dynamic interface T-interface when created having the same type signature as the type T;
  recognizing by computation in the environment at least one registered augmented type T-augmentation which implements the dynamic interface T-Interface and which upon execution in an adjusted environment provides only functionality O that is orthogonal to the indicated functionality of type T in at least one of the following ways: functionality O is not indicated within a production version of an application having functionality of type T, functionality O does not directly support the application, functionality O is not specific to a field of operation of the application, functionality O is fulfilled as an added value to the application and performs actions which are auxiliary to the application; and
  adjusting the computational environment by overriding a constructor for the type T to provide an adjusted environment in which an instantiation of type T by an application program executing in the adjusted environment automatically generates an instance of the augmented type T-augmentation supporting functionality O transparently to the application program, the process being performed without modifying the application program in that behavior is added through signature preserving augmentation of a definition of an object of type T, the definition including one or more of a constructor, members, and methods within a namespace in which object definitions are attached to named types.

9. The computer-readable storage medium of claim 8, wherein the process comprises:
  receiving in the environment a request to make an instance of type T;
  generating in the environment, transparently to the application program, for each of a collection of registered augmentations, an instance of the augmentation which provides only functionality that is orthogonal to the indicated functionality of type T;
  making an instance of type T; and
  returning a composition of the registered augmentations and the instance in response to the request to make an instance of type T.

10. The computer-readable storage medium of claim 8, wherein the process comprises composing all registered augmentations having a given signature with each type in the environment that has that signature.

11. The computer-readable storage medium of claim 8, wherein the type T is a not a base type from which one or more of the registered augmentations inherit.

12. The computer-readable storage medium of claim 8, wherein registered augmentations for type T were registered in a registration order and also have a composition order which is not the registration order and is not the registration order in reverse.

13. The computer-readable storage medium of claim 8, wherein functionality O directed by the dynamic interface T-Interface is orthogonal to the indicated functionality of type T in that the dynamic interface T-Interface is limited to one or more of the following functionalities: logging, validation, inspection of data without alteration of the data, or reporting on one of the foregoing.

14. The computer-readable storage medium of claim 8, wherein functionality O directed by the dynamic interface T-Interface is orthogonal to the indicated functionality of type T in that the dynamic interface T-Interface is limited to one or more of the following functionalities: localization, malware scanning, scanning for a code security vulnerability, or reporting on one of the foregoing.

15. A computer system comprising:
  a processor;
  a memory in operable communication with the processor;
  an augmentation registrar residing in the memory and having code which upon execution with the processor registers object type augmentations in a computational environment of the computer system;
  at least one object type T having a type signature that includes a constructor, zero or more members, and zero or more method signatures, the object type T also having an indicated functionality;
  at least one augmentation registered by the augmentation registrar, the augmentation having the same type signature as type T, the augmentation upon execution providing only functionality O that is orthogonal to the indicated functionality of type T in at least one of the following ways: functionality O is not indicated within a production version of an application having functionality of type T, functionality O does not directly support the application, functionality O is not specific to a field of operation of the application, functionality O is fulfilled as an added value to the application and performs actions which are auxiliary to the application; and at least one application program which includes at least one call to make an instance of the object type T;

the environment characterized in that execution of the call to make an instance of the object type T returns, supporting functionality O transparently to the application and without modifying the application program, a composition of the registered augmentations with an instance of type T, the supporting performed without modifying the application program in that behavior is added through signature preserving augmentation of a definition of an object of type T, the definition including one or more of a constructor, members, and methods within a namespace in which object definitions are attached to named types.

16. The system of claim 15, wherein the registered augmentations comprise at least one of the following augmentation codes:

augmentation code having functionality which is orthogonal to the indicated functionality of type T in that during normal execution data values returned to the application program via the augmentation code are the same as data values that would be returned to the application program without the augmentation code, where normal execution is execution of software that does not result in an exception, a hang, a memory access error, or a crash;

augmentation code having functionality which is orthogonal to the indicated functionality of type T in that the augmentation code is limited to logging and reporting on said logging;

augmentation code having functionality which is orthogonal to the indicated functionality of type T in that the augmentation code is limited to validation and reporting on said validation;

augmentation code having functionality which is orthogonal to the indicated functionality of type T in that the augmentation code is limited to localization and reporting on said localization;

augmentation code having functionality which is orthogonal to the indicated functionality of type T in that the augmentation code is limited to inspection of data without alteration of the data and reporting on said inspection;

augmentation code having functionality which is orthogonal to the indicated functionality of type T in that the augmentation code is limited to malware scanning and reporting on said scanning; or augmentation code having functionality which is orthogonal to the indicated functionality of type T in that the augmentation code is limited to scanning for a code security vulnerability and reporting on said scanning.

17. The system of claim 16, wherein the registered augmentations comprise at least two of the augmentation codes.

18. The system of claim 15, wherein the type T is a not a base type from which any of the registered augmentations inherit.

19. The system of claim 15, wherein the environment comprises code which upon execution performs the following:

receives in the environment a request to make an instance of type T;

generates in the environment, transparently to the application program, for each of a collection of registered augmentations, an instance of the augmentation which provides only functionality that is orthogonal to the indicated functionality of type T; and returns a composition of the registered augmentations and an instance of type T in response to the request.

20. The system of claim 15, wherein the augmentation registrar operates in the system as part of a class factory framework in which object definitions are attached to named types.

* * * * *